United States Patent
Gizaw et al.

(10) Patent No.: US 11,260,914 B2
(45) Date of Patent: Mar. 1, 2022

(54) HOLDER FOR AN INTERIOR TRIM PART, AND VEHICLE BODY STRUCTURE

(71) Applicant: Bayerische Motoren Werke Aktiengesellschaft, Munich (DE)

(72) Inventors: Bekele Gizaw, Heinsdorfergrund (DE); Bruno Roth, Landshut (DE); Peter Satzger, Landsberg am Lech (DE); Martin Schwabl, Hohenthann (DE); Christina Selmeier, Wolnzach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 319 days.

(21) Appl. No.: 16/676,665

(22) Filed: Nov. 7, 2019

(65) Prior Publication Data
US 2020/0156709 A1 May 21, 2020

(30) Foreign Application Priority Data
Nov. 19, 2018 (DE) .................... 10 2018 128 997.9

(51) Int. Cl.
*B60J 7/00* (2006.01)
*B62D 25/14* (2006.01)
(Continued)

(52) U.S. Cl.
CPC ....... *B62D 25/142* (2013.01); *B60H 1/00564* (2013.01); *B60H 1/00571* (2013.01);
(Continued)

(58) Field of Classification Search
CPC ............ B29C 49/74; B60R 2013/0287; B60R 13/0243; F21S 8/026; F21S 8/02; F21Y 2115/10; B60N 3/102; F21V 21/30
See application file for complete search history.

(56) References Cited

U.S. PATENT DOCUMENTS 6,371,548 B1 * 4/2002 Misaras .................. B60R 13/02
 296/146.7
8,006,419 B2 * 8/2011 Kabalka .................. G09F 3/203
 40/593

(Continued)

FOREIGN PATENT DOCUMENTS

DE 10 2007 062 898 A1 9/2009
DE 10 2010 047 907 A1 4/2012
DE 10 2017 206 304 A1 10/2018

OTHER PUBLICATIONS

German-language Search Report issued in counterpart German Application No. 10 2018 128 997.9 dated Oct. 15, 2019 with partial English translation (15 pages).

*Primary Examiner* — Kiran B Patel
(74) *Attorney, Agent, or Firm* — Crowell & Moring LLP

(57) ABSTRACT

A holder for an interior trim part, in particular for covering the passenger compartment of a motor vehicle, has at least one supply line for guiding a temperature-controllable, liquid or gaseous fluid, to an outlet via which the fluid can emerge from the supply line, and an inlet via which the fluid can enter a discharge line. An interior trim part can be arranged on the holder in such a manner that the outlet of the holder is fluidically connected to an inlet of the interior trim part, and the inlet of the discharge line of the holder is fluidically connected to an outlet of the interior trim part.

16 Claims, 1 Drawing Sheet

(51) Int. Cl.
*B62D 25/02* (2006.01)
*B62D 25/04* (2006.01)
*B62D 25/06* (2006.01)
*B60H 1/00* (2006.01)
*B62D 29/00* (2006.01)
*B60R 16/08* (2006.01)
*B62D 25/20* (2006.01)

(52) U.S. Cl.
CPC ............ *B60R 16/08* (2013.01); *B62D 25/025* (2013.01); *B62D 25/04* (2013.01); *B62D 25/06* (2013.01); *B62D 25/145* (2013.01); *B62D 25/20* (2013.01); *B62D 29/00* (2013.01)

(56) References Cited

U.S. PATENT DOCUMENTS

| | | | | |
|---|---|---|---|---|
| 8,801,056 | B2* | 8/2014 | Herve | B60Q 1/0408 293/1 |
| 2004/0145208 | A1* | 7/2004 | Kapteyn | B60K 37/04 296/70 |
| 2005/0134090 | A1* | 6/2005 | Kring | B62D 25/145 296/193.02 |
| 2007/0108742 | A1* | 5/2007 | Itakura | B60R 21/213 280/728.3 |
| 2011/0107634 | A1* | 5/2011 | Kabalka | G09F 21/04 40/606.01 |
| 2012/0193933 | A1* | 8/2012 | Spitler | B62D 25/14 296/74 |
| 2014/0117693 | A1* | 5/2014 | Schmitz | B60H 1/248 296/1.08 |
| 2014/0300090 | A1* | 10/2014 | Pechnyk | B60K 37/00 280/732 |
| 2016/0001646 | A1* | 1/2016 | Yamada | B60J 5/0418 52/716.5 |
| 2016/0229348 | A1* | 8/2016 | Farooq | B60R 7/046 |
| 2018/0186295 | A1* | 7/2018 | Akdag Cakir | B60J 5/0413 |
| 2019/0308561 | A1* | 10/2019 | Siegler | B60R 13/011 |
| 2020/0156709 | A1* | 5/2020 | Gizaw | B62D 25/20 |
| 2021/0146859 | A1* | 5/2021 | Siddiqui | B60R 13/0256 |

* cited by examiner

HOLDER FOR AN INTERIOR TRIM PART, AND VEHICLE BODY STRUCTURE

CROSS REFERENCE TO RELATED APPLICATION

This application claims priority under 35 U.S.C. § 119 from German Patent Application No. 10 2018 128 997.9, filed Nov. 19, 2018, the entire disclosure of which are herein expressly incorporated by reference.

BACKGROUND AND SUMMARY OF THE INVENTION

The present invention relates to a holder for an interior trim part and to a vehicle body structure having such a holder.

In order to air condition the vehicle interior of motor vehicles, air cooling/air heating is used as standard. Hot or cold air is blown into the driver's cab or the passenger compartment in order to reach the desired required temperature. This direct air flow is frequently perceived by the vehicle occupants as unpleasant since it does not optimally distribute the heat or cold and, moreover, causes noise. An air flow on one side can result, for example, in excessively hot dry air, causing irritation of the eyes and mucous membranes, with the passengers simultaneously possibly having cold feet. Even with cold air, the respiratory tracts may be irritated or excessive cooling may occur at specific points.

In order to prevent temperature control at specific spots and the air flow which is perceived as unpleasant, and in order to make the air conditioning more pleasant, it is attempted to design the air outlet to be as large and indirect as possible. Another possibility is the generation of surface heating in the passenger compartment, wherein the temperature of the vehicle components in the interior of the passenger compartment is directly controlled. A component assembly has been proposed in DE 10 2017 206 304.1.

However, the temperature control of the passenger compartment by surface cooling/surface heating requires a multiplicity of lines behind the trim in order to be able to readily distribute the temperature-controlling capability. To connect said lines is complicated, awkward, produces additional weight, and requires additional construction space.

Taking this prior art as the starting point, it is the object of the present invention to provide a holder for an interior trim part, and a vehicle body structure with such a holder, which holder and vehicle body structure overcome the disadvantages of the prior art.

This and other objects are achieved according to the invention by providing a holder for an interior trim part, in particular for covering the passenger compartment of a motor vehicle. The holder includes at least one supply line for guiding a temperature-controllable fluid to an outlet from which the fluid can emerge from the supply line. The holder further includes an inlet via which the fluid can enter a discharge line. Furthermore, an interior trim part can be arrangeable on the holder in such a manner that the outlet of the holder is fluidically connected to an inlet of the interior trim part, and the inlet of the discharge line of the holder is fluidically connected to an outlet of the interior trim part. This affords the advantage that the lines and connections are integrated into the substructures of the interior trim parts which are necessary in any case, and therefore the complexity when connecting the lines necessary for conducting the temperature-controllable medium is simplified. Furthermore, the material required for the lines can be saved. In other words, a holder with media supply and/or media discharge can be realized by the invention.

In particular, temperature-controlled, i.e. heated or cooled, gases are suitable here as the fluid. As an alternative thereto, however, temperature-controllable liquids such as water or oils can also be used as the fluid.

Within the context of this invention, interior trim parts are in particular dashboard carriers or instrument panel carriers, coverings of the A pillar, B pillar or C pillar, coverings of the center console, glove compartment cover, and the like.

The holder can be configured as a sill, an A, B, C or D pillar, a roof bow, a roof side frame, a floor assembly, and/or a substructure of the instrument panel carrier. This affords the advantage of a highly integrated design in which existing structural parts are used for conducting media.

Furthermore, the inlet and/or the outlet of the holder can be configured as a flexible coupling. Flexible couplings afford the advantage that manufacturing tolerances in the production of the interior trim components or of the substructures can be compensated for. Furthermore, variants of interior trim components, in which the position of the inlets and/or outlets slightly differ, can be mounted on the same type of substructure.

Alternatively thereto, the inlet and/or the outlet can be configured as a rigid plug-in connection. Rigid connections afford advantages during the installation process since the interior trim parts can simply be plugged onto the substructure, with a fluidic connection being produced at the same time.

The interior trim part can be configured as a dimensionally stable integral foam molded part, in particular composed of an injection molded integral foam component. The porous structure of the rigid foam material enables fluids to flow through the component. The outer layer of the component here is compact and ensures the tightness of the component with respect to the fluid used. This form of cooling is significantly more efficient than conventional air cooling.

The integral foam molded part can have a cellular core and a fluid-tight outer surface.

The cells of the core can be fluidically connected to one another, wherein the core is fluidically connected both to the inlet and to the outlet.

The use of an interior trim part composed of an expandable plastics material, wherein the inner region (core) has an open-pore foam structure and is integrally connected to the outer wall, affords the following advantages. Such an interior trim part can preferably be produced in an integral injection molding process (SGI). The SGI process is known from the prior art. In order to produce what are referred to as SGI components, between two mold halves which form a cavity, an expandable plastics compound is introduced into said cavity. The plastics compound here substantially completely fills the cavity and solidifies from the outer regions of the plastics compound toward the inner region of the plastics compound. As soon as the plastics compound has reached a certain degree of solidification, it loses its expandability. This effect is used to the extent that first of all there is a wait for a predetermined time until the edge regions have solidified and therefore the outer wall of the carrier part has been formed. The mold is then moved apart by what is referred to as the SGI stroke such that the cavity undergoes an increase in volume. The outer walls are likewise moved apart here such that the inner region of the plastics compound lying in between is increased. The plastics compound which has not yet solidified can now expand in the inner region of the carrier part between the outer walls. The use of an SGI component as carrier part in the production of a multi-layered plastics component affords the advantage that the inner expanded region has pores or alveoli or cells through which the fluid can diffuse or flow. Such SGI parts can be configured in the form of an expanded thermoplastic, through the foam structure of which a heating and/or cooling medium can flow. Patent application DE 102017206304 describes such a component. The latter consists of a sealed outer surface or outer wall and a cellular core. At least part of the cellular core is configured here as a heat exchange region.

Furthermore, the supply line and the discharge line can be formed integrally on the holder. The holder can thereby be used as the distributor in order to save on additional costs, additional weight, construction space and complexity due to flexible laid lines. The embedding of lines into the holder/substructure of the interior trim takes place here directly in the production process of the holder by an injection molding internal pressure process or by lines inserted and injected in the injection molding process.

In other words, the distributor channels, i.e. the supply lines and/or discharge lines, can be integrated in the holder by an—optionally partial—injection molding integral foam process. As an alternative thereto, the integration of the channels into the holder can be carried out by gas internal pressure, a water internal pressure technique or projectile technique when the holder is produced by compact injection molding.

In a further aspect, the invention relates to a vehicle body structure with a holder as described above and with an interior trim part arranged thereon, wherein the interior trim part is configured as a dimensionally stable integral foam part. As a result, a vehicle interior can be more effectively air conditioned with surface temperature control by use of a liquid/gaseous medium. The SGI interior trim parts used for this purpose are described by way of example in DE 102017206304 and, according to the invention, can be connected particularly simply to a media circuit.

Owing to the different coefficients of expansion of the materials of the holder and of the interior trim part and also the time delay in the temperature control process, expansion joints or elastic compensating elements can be structurally integrated. By way of the lines integrated in the holder/substructure, the complicated connection of additional lines for the media circuit is dispensed with. Furthermore, the installation is simplified because of the few direct connections. In addition, the space and the material for the additional lines are dispensed with.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
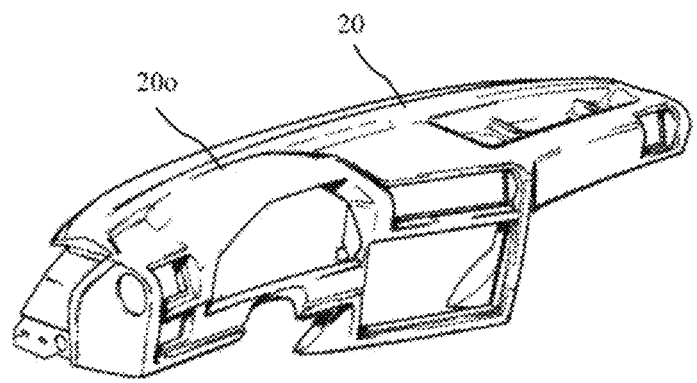
FIG. 1 is a perspective view of an instrument panel carrier.

FIG. 1 shows by way of example an instrument panel carrier 20 which is intended to serve as an exemplary interior trim part 20 for explaining the invention. As an alternative to the panel carrier illustrated, all other trim parts situated in the interior, such as glove compartments, center armrests, panels, armrests in the door trims, door trims, roof linings, etc., or partial regions thereof, can also serve for this purpose. This instrument panel carrier 20 has a surface 20o which is relatively large and is therefore particularly suitable for serving as surface heating.

As illustrated in FIG. 1, the surface 20o may relate only to a portion, such as, for example, the upper surface of the hood of what is referred to as the instrument cluster. However, the surface 20o used for the heat exchange may also be that part of the surface of the carrier structure 10 which would be able to be seen by a vehicle occupant in the interior of the vehicle or is oriented toward the passenger compartment. Furthermore alternatively, the surface 20o may also comprise the entire surface of the instrument panel carrier 20, wherein even regions of the instrument panel carrier 20 which cannot be seen by a vehicle occupant would then contribute to the convection.

Figure 2:
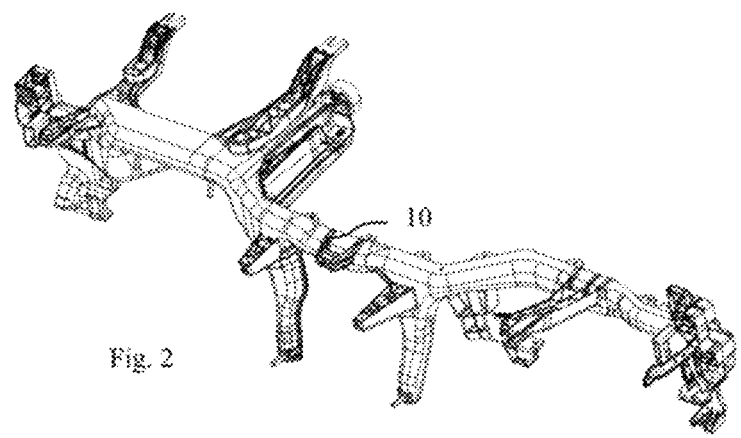
FIG. 2 is a perspective view of a holder for an instrument panel carrier.

FIG. 2 shows a substructure 10 on which the instrument panel carrier from FIG. 1 is mounted. Of course, in further embodiments (not illustrated) of the invention, the substructure 10 can be provided with individual segments of the interior trim part 20. The instrument panel carrier here is constructed from different individual portions which are connected separately in a positionally fixed manner to the holder 10 located therebelow. Although the invention is explained with reference to an instrument panel carrier 20 and a holder therefor, the invention is not intended to be restricted thereto. It would also be possible for the holder to be configured as a B pillar and for the interior trim parts to be trim parts of the B pillar, for example in the region of the belt guide. The same is also true of other structural elements of the body in the region of the A pillar, the C pillar of the roof side frame, etc., which can serve as a holder for interior trims. A common feature of all these elements is that they are in any case necessary for forming the body structure. A media guide can therefore be integrated into said components which are often configured in the manner of a prism with a closed profile.

Figure 3:
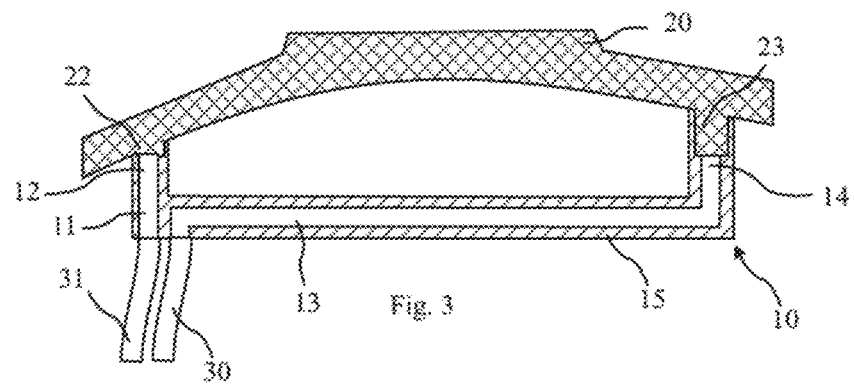
FIG. 3 is a schematic sectional view through an assembly in which an interior trim part is arranged on a holder.

FIG. 3 schematically depicts a holder 10. An interior trim part 20 is mounted on the holder 10. A supply line 11 and a discharge line 13 are formed in the holder 10. In order to control the temperature of the interior trim part 20, and therefore to control the temperature of the passenger compartment, a medium (not illustrated) in a temperature control device is brought to a predetermined temperature. The medium is subsequently guided via the line 31 to the holder 10. The medium flows here into the holder 10. In the holder 10, the medium flows through the supply line 11 as far as an outlet 12. Said outlet is connected in a fluidically sealed manner to an inlet 22 on the interior trim part 20 such that the fluid can flow into the interior of the interior trim part 20. Owing to the porous open cell structure of the interior trim part 20, said fluid flows through the interior trim part and, in the process, dispenses thermal energy to the surroundings of the interior trim part 20 via the surface 20o thereof. An outlet 23 of the interior trim part is depicted in the right half of the figure of the interior trim part 20. The outlet 23 is connected in a fluidically sealed manner to an inlet 14 of the holder. The fluid enters here again into the holder 10, flows through the latter through the discharge channel 13 as far as the line 30 via which the fluid is guided again to the temperature control device.

Compared with surface heaters known from the prior art for motor vehicles, the media-conducting lines are now no longer laid separately, but rather are directly integrated in the holder of the interior trim part. In particular if the holder 10 is formed from plastic, the lines 11 and 13 can be realized integrally during the production of the holder. The hollow space of the lines can be produced in an injection molding process by the known gas internal pressure process during the injection molding of the component. As is apparent from FIG. 3, the holder 10 is then configured as a relatively thin-walled plastics component. As an alternative thereto, a tubular line can already be inserted in the injection molding process and insert molded in the injection molding process.

Instead of plastics parts, components made of metal, in which tubular supply and discharge lines are integrated, can also be used for the holder 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A holder for an interior trim part, comprising:
    at least one supply line for guiding a temperature-controllable, liquid or gaseous fluid to an outlet via which the fluid emerges from the supply line;
    an inlet via which the fluid enters a discharge line, wherein
    an interior trim part is arrangeable on the holder such that:
        the outlet of the holder is fluidically connected to an inlet of the interior trim part, and
        the inlet of the discharge line of the holder is fluidically connected to an outlet of the interior trim part.
2. The holder according to claim 1, wherein
    the holder is for an interior trim part for a passenger compartment of a motor vehicle.
3. The holder according to claim 1, wherein
    the holder is configured as a sill, an A, B, C or D pillar, a roof bow, a roof side frame, a floor assembly, and/or an instrument panel carrier substructure.
4. The holder according to claim 1, wherein
    one or both of the inlet and the outlet is configured as a flexible coupling.
5. The holder according to claim 1, wherein
    one or both of the inlet and the outlet is configured as a rigid plug-in connection.
6. The holder according to claim 1, wherein
    the interior trim part is configured as a dimensionally stable integral foam molded part.
7. The holder according to claim 6, wherein
    the integral foam molded part has a cellular core and a fluid-tight outer surface.
8. The holder according to claim 7, wherein
    cells of the cellular core are fluidically connected to one another, and the cellular core is fluidically connected both to the inlet and to the outlet.
9. The holder according to claim 1, wherein
    the supply line and the discharge line are formed integrally on the holder.
10. A vehicle body structure, comprising:
    an interior trim part formed as a dimensionally stable integral foam part; and
    a holder for the interior trim part, the holder comprising:
    at least one supply line for guiding a temperature-controllable, liquid or gaseous fluid to an outlet via which the fluid emerges from the supply line;
    an inlet via which the fluid enters a discharge line, wherein
    an interior trim part is arrangeable on the holder such that:
        the outlet of the holder is fluidically connected to an inlet of the interior trim part, and
        the inlet of the discharge line of the holder is fluidically connected to an outlet of the interior trim part.
11. The vehicle body structure according to claim 10, wherein
    the holder is configured as a sill, an A, B, C or D pillar, a roof bow, a roof side frame, a floor assembly, and/or an instrument panel carrier substructure.
12. The vehicle body structure according to claim 10, wherein
    one or both of the inlet and the outlet is configured as a flexible coupling.
13. The vehicle body structure according to claim 10, wherein
    one or both of the inlet and the outlet is configured as a rigid plug-in connection.
14. The vehicle body structure according to claim 10, wherein
    the integral foam molded part has a cellular core and a fluid-tight outer surface.
15. The vehicle body structure according to claim 14, wherein
    cells of the cellular core are fluidically connected to one another, and the cellular core is fluidically connected both to the inlet and to the outlet.
16. The vehicle body structure according to claim 10, wherein
    the supply line and the discharge line are formed integrally on the holder.

* * * * *